(12) United States Patent
Maegawa et al.

(10) Patent No.: US 10,830,569 B2  
(45) Date of Patent: Nov. 10, 2020

(54) MISALIGNMENT DETERMINING DEVICE

(71) Applicant: BIG DAISHOWA CO., LTD., Osaka (JP)

(72) Inventors: Naoki Maegawa, Osaka (JP); Hirotsune Ozaki, Osaka (JP)

(73) Assignee: Big Diashowa Co., Ltd., Osaka (JP)

(*) Notice: Subject to any disclaimer, the term of this patent is extended or adjusted under 35 U.S.C. 154(b) by 221 days.

(21) Appl. No.: 16/090,437

(22) PCT Filed: Jul. 28, 2016

(86) PCT No.: PCT/JP2016/072221  
§ 371 (c)(1),  
(2) Date: Oct. 1, 2018

(87) PCT Pub. No.: WO2018/020646  
PCT Pub. Date: Feb. 1, 2018

(65) Prior Publication Data  
US 2019/0113323 A1  Apr. 18, 2019

(51) Int. Cl.  
*G01B 5/25* (2006.01)  
*G01B 3/22* (2006.01)  
(Continued)

(52) U.S. Cl.  
CPC ............... *G01B 5/25* (2013.01); *B23Q 3/186* (2013.01); *B23Q 17/22* (2013.01); *G01B 3/22* (2013.01)

(58) Field of Classification Search  
CPC . G01B 5/25; G01B 3/22; B23Q 17/22; B23Q 3/186; B23Q 17/2275  
(Continued)

(56) References Cited

U.S. PATENT DOCUMENTS 3,914,869 A  10/1975  Merz et al.  
4,439,925 A  4/1984  Lock  
(Continued)

FOREIGN PATENT DOCUMENTS

CN  201253781 Y  6/2009  
CN  205049092 U  2/2016  
(Continued)

OTHER PUBLICATIONS

Chinese Office Action dated Sep. 27, 2019 with English Translation.  
(Continued)

*Primary Examiner* — Yaritza Guadalupe-McCall  
(74) *Attorney, Agent, or Firm* — Dilworth & Barrese, LLP (57) ABSTRACT

The device includes a tubular case having a through hole that extends therethrough in an axial direction, a test indicator capable of determining a minute amount of change of distance by a stylus, a tubular holder body rotatably attached to the case through the through hole, a supporting body for supporting the holder body, a slidable body provided on a radial inner side of the holder body and movable relative to the holder body along the axial direction, and a pivotal body having a pivotable leading end portion whose pivotal amount is transmitted to the slidable body. The slidable body has an axial extension portion formed along the axial direction and a radial extension portion formed along the radial direction. The stylus and the radial extension portion are configured to come into contact with each other.

4 Claims, 6 Drawing Sheets

(51) Int. Cl.
*B23Q 17/22* (2006.01)
*B23Q 3/18* (2006.01)

(58) Field of Classification Search
USPC .................................................. 33/626, 645
See application file for complete search history.

(56) References Cited

U.S. PATENT DOCUMENTS

| | | | | |
|---|---|---|---|---|
| 5,704,132 | A * | 1/1998 | Bourne | G01B 5/0002 |
| | | | | 33/628 |
| 7,458,168 | B2 * | 12/2008 | Furukawa | G01B 5/252 |
| | | | | 33/535 |
| 2011/0293169 | A1 * | 12/2011 | Bonadeo | G01B 11/2425 |
| | | | | 382/152 |
| 2016/0033267 | A1 * | 2/2016 | Killingbeck | G01B 5/25 |
| | | | | 33/645 |
| 2019/0025793 | A1 * | 1/2019 | Ould | B23Q 17/22 |
| 2019/0113323 | A1 * | 4/2019 | Maegawa | B23Q 17/22 |
| 2019/0358762 | A1 * | 11/2019 | Lause | B23Q 17/225 |

FOREIGN PATENT DOCUMENTS

| | | |
|---|---|---|
| EP | 2 977 714 A1 | 1/2016 |
| FR | 2778738 A1 | 11/1999 |
| GB | 1 454 621 A | 11/1976 |
| JP | H7-227741 A | 8/1995 |
| JP | H8-61907 A | 3/1996 |
| JP | 2000-329508 A | 11/2000 |

OTHER PUBLICATIONS

Translation of the International Preliminary Report on Patentability from PCT/JP2016/072221 dated Feb. 7, 2019.

* cited by examiner

MISALIGNMENT DETERMINING DEVICE

TECHNICAL FIELD

The present invention relates to a misalignment determining device for use in determining misalignment of a center to be used in a lathe, a cylindrical grinder, etc.

BACKGROUND ART

For instance, PTL 1 discloses a dial gauge type centering device for effecting determination of misalignment of a center and centering of the center. The device disclosed in PTL 1 is configured as follows. Under a state where a bar-like stylus (30) mounted to a stylus mounting member (29) is placed in contact with a determination target surface of a work (W), if an external force is applied to this bar-like stylus (30), a swing arm (28) pivots about a pivot fulcrum (33). And, this swing arm (28) pushes a slide shaft (12) protruding from a leading end of a main shaft (4). As the slide shaft (12) is pushed, a slide collar (7) is pushed via a transverse pin (14). And, with this pushing of the slide collar (7), a gauge terminal shaft (17) of a dial gauge (9) is moved via an arm receiving pin (24) and a support arm (20), whereby a pointer (19) is pivoted. In PTL 1, the bar-like stylus (30) is placed in contact with an inner circumferential face of a hole portion (H) of the work (W) and in addition, a spindle (S) of a machine tool is rotated at a low speed, and based on a pivoting of the pointer (19) associated with rotation of the spindle (S), misalignment of the center of the work (W) is determined.

CITATION LIST

Patent Literature

PTL 1: Japanese Unexamined Patent Application Publication H07-227741.

SUMMARY

Technical Problem

Here, as standard dial gauges, there are a lever type test indicator configured such that a pointer is pivoted based on a pivotal amount of a stylus which comes into contact with a determination target article and a spindle type dial gauge configured such that the pointer is pivoted based on a protrusion/retraction amount of the stylus, both of these being simple in configuration. However, the device disclosed in PTL 1 described above has a complicated configuration that determination of center misalignment involves many components such as the swing arm (28), the arm receiving pin (24), the support arm (20), etc. And, the device of PTL 1, due to its complicated configuration, cannot employ a standard dial gauge having a simple configuration such as the lever type test indicator or the spindle type dial gauge.

The present invention has been made in view of the above-described state of the art and its object is to provide a misalignment determining device that allows determination of center misalignment using a dial gauge having a simple configuration.

Solution to Problem

For accomplishing the above-noted object, according to a characterizing feature of a misalignment determining device relating to this disclosure, the device comprises:

a tubular case having a through hole that extends therethrough in an axial direction;

a test indicator attached to an outer face of the case and capable of determining a minute amount of change of distance by a stylus;

a tubular holder body rotatably attached to the case coaxially with the axis of the case and through the through hole;

a supporting body attached to a base end side of the holder body for supporting the holder body;

a slidable body provided on an inner side of the holder body in a radial direction and movable relative to the holder body along the axial direction;

a pivotal body attached to a leading end side of the slidable body and having a pivotable leading end portion whose pivotal amount is transmitted to the slidable body;

the slidable body including an axial extension portion formed along the axial direction and a radial extension portion formed along the radial direction; and the stylus of the test indicator and the radial extension portion of the slidable body coming into contact with each other, so that a pivotal amount of the pivotable body is transmitted via the axial extension portion to the radial extension portion of the slidable body to be determinable by the stylus of the test indicator in contact with the radial extension portion.

With the above-described arrangement, the pivotal body is pivoted according to a misalignment amount of a subject article of determination (a "determination target article") and the amount of this pivoting is transmitted via the axial extension portion of the slidable body to its radial extension portion. Namely, when the pivotal body is pivoted, the slidable body is moved in the axial direction by an amount corresponding to the amount of this pivoting and its radial extension portion too is moved in the axial direction. And, in correspondence with the amount of this pivoting, the stylus of the test indicator placed in contact with this radial extension portion is pivoted; thus, the misalignment determining device relating to the present disclosure can determine misalignment of the determination target article. Namely, with the above arrangement, misalignment of a determination target article can be determined by placing the stylus of the test indicator into contact with the radial extension portion of the slidable body and determining an amount of resultant movement of the radial extension portion in the axial direction. Therefore, according to the above-described configuration, misalignment of a determination target article can be determined with using a well-known test indicator having a simple configuration.

In the above-described configuration, preferably:

the slidable body has a through hole that extends through the radial extension portion in the axial direction;

the holder body has an insertion portion to be inserted into the through hole; and when an inner circumferential face of the through hole comes into contact at least partially with an outer circumferential face of the insertion portion as the insertion portion is inserted in the through hole, the holder body becomes non-rotatable in a circumferential direction relative to the radial extension portion.

With the above-described arrangement, when the insertion portion is inserted in the through hole and also an inner circumferential face of the through hole comes into contact with at least a part of an outer circumferential face of the insertion portion, the slidable body and the holder body become non-rotatable relative to each other in the circumferential direction. Further, as the through hole extends through in the axial direction, while the slidable body and the holder body have their rotation relative to each other inhibited as described above, these members, i.e. the slidable body and the holder body, can move relative to each other in the axial direction. Namely, with the misalignment determining device having the above-described arrangement, while a determination error due to relative rotation between the slidable body and the holder body is prevented, relative movement of the slidable body and the holder body is allowed for precise determination of misalignment of the determination target article.

Further, in the above-described configuration, preferably: the supporting body has an adjustment slit which is formed as a portion cut out along a direction perpendicular to the axial direction and an adjustment pressing portion configured to press one of opposed faces of the adjustment slit farther from the holder body for applying a force to the adjustment slit in a direction of opening it; and the adjustment pressing portion is disposed at a position away from the axis in the radial direction.

With the above-described arrangement, the adjustment slit can be opened by pressing one of the opposed faces of this adjustment slit which one face is away from the holder body. Further, the adjustment pressing portion for applying the force to the adjustment slit in its opening direction is disposed at a position away from the axis in the radial direction. Therefore, the farther a portion radially from the axis corresponding to the position of the adjustment pressing portion, the greater the opening amount of the adjustment slit and the closer to the axis, the smaller the opening amount of the adjustment slit. Namely, with such non-uniform opening of the adjustment slit, the supporting body will be tilted relative to the axial direction across this adjustment slit, so that other member such as the holder body, etc. supported to this supporting body will also be tilted relative to the axial direction. Therefore, with the misalignment determining device having the above-described arrangement, by opening/closing the adjustment slit by the adjustment pressing portion, fine adjustment of tilt of the misalignment determining device relative to the axial direction is made possible. As a result, the misalignment determining device can be adjusted for its tilt in such a manner to assume a posture aligned with the axial direction, thus enabling precise determination of misalignment of the determination target article.

Further and other features and advantages of the technique relating to this disclosure will become apparent upon reading the following explanation of illustrative and non-limiting embodiments given below with reference to the accompanying drawings.

DESCRIPTION OF EMBODIMENTS

Main Embodiment

Figure 1:
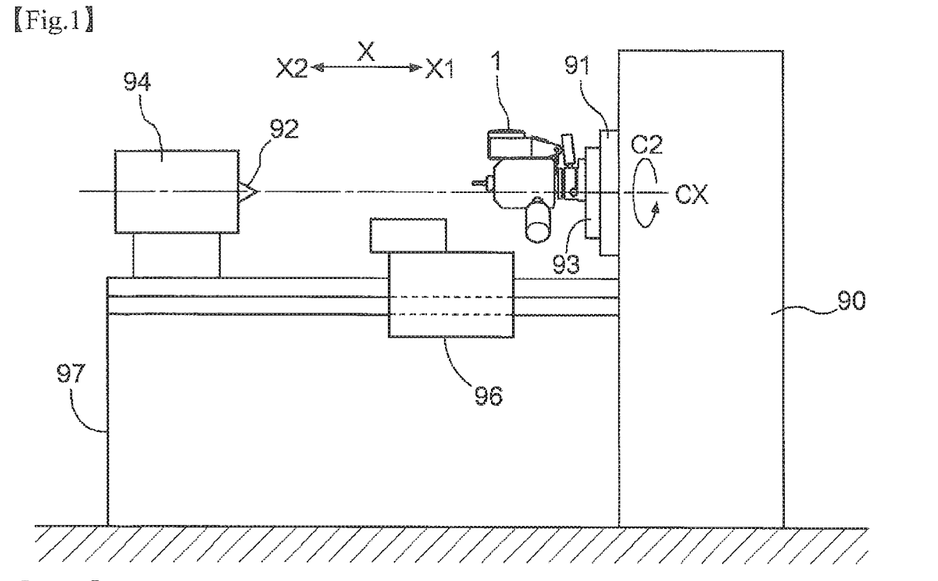
FIG. 1 is a front view showing the gist of a misalignment determining device relating to a main embodiment.
Figure 2:
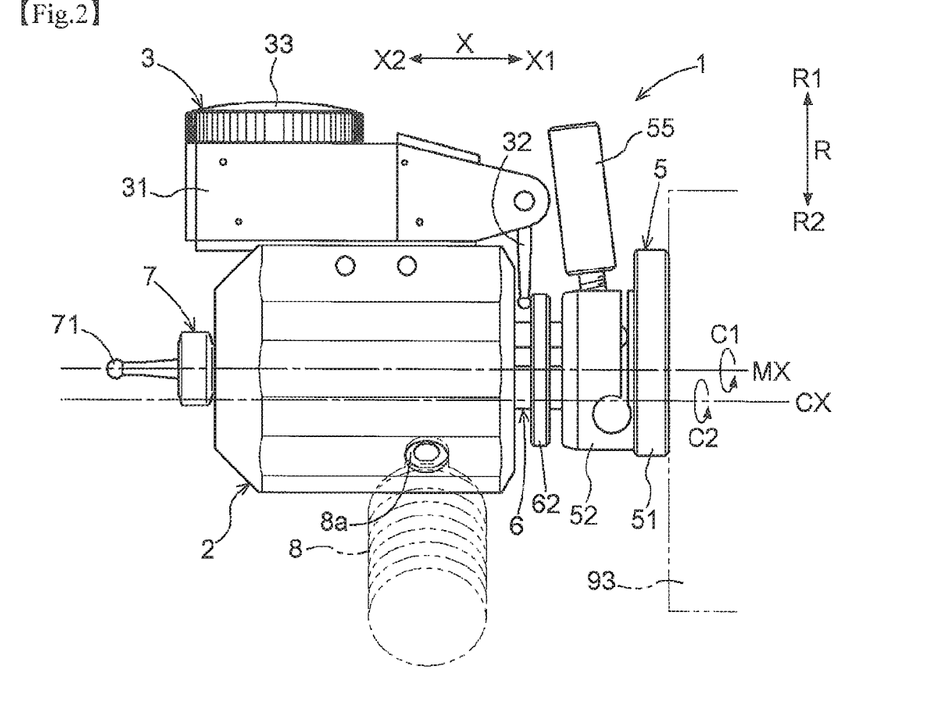
FIG. 2 is a front view showing the misalignment determining device.

Next, a misalignment determining device 1 relating to a main embodiment will be explained with reference to the accompanying drawings. As shown in FIG. 1, the misalignment determining device 1 can be used e.g. in a lathe as a machine tool. In FIG. 1, for a rotary drive device 90 for rotating a chuck 91 about a main axis CX, a tailstock platform 94 with a center 92 attached thereto is disposed at a position in opposition to the rotary drive device 90 in an axial direction X. And, the rotary drive device 90 and the tailstock platform 94 are coupled to each other in the axial direction X via a table 97. On the table 97, there is provided a cutter mount 96 which is movable in the axial direction X. With such lathe as above, a base end portion of a work (not shown) as a milling subject article is gripped by the chuck 91 from which the misalignment determining device 1 is removed. Then, by pressing the leading end of this work in an axial first direction X1 with the center 92 of the tailstock platform 94, the work is fixed from its opposed ends in the axial direction X. And, the rotary driven device 90 is operated to rotate the work about the main axis CX, whereby the rotated work will be cut/milled by a cutter blade (not shown) mounted to the cutter mount 96. For precision milling of the work, it is necessary for the main axis CX of the chuck 91 and the axis of the center 92 to be in agreement with each other. The misalignment determining device 1 is provided for determining misalignment if any in the center 92 relative to the main axis CX, prior to milling of the work. The misalignment determining device 1 is mounted to a disc-like rotary table 93 gripped by the chuck 91. Also, the misalignment determining device 1 is disposed at a position offset from the main axis CX. Incidentally, the mark CX shown in the drawing represents the main axis CX as the rotational axis for rotating the chuck 91 by the rotary drive device 90. A mark MX shown in FIG. 2 represents the axis of the misalignment determining device 1 and which is also a movement axis MX for revolution about the main axis CX. Further, the circumferential direction about the movement axis MX will be defined herein as a first circumferential direction C1, whereas the circumferential direction about the main axis CX will be defined herein as a second circumferential direction C2.

Figure 3:
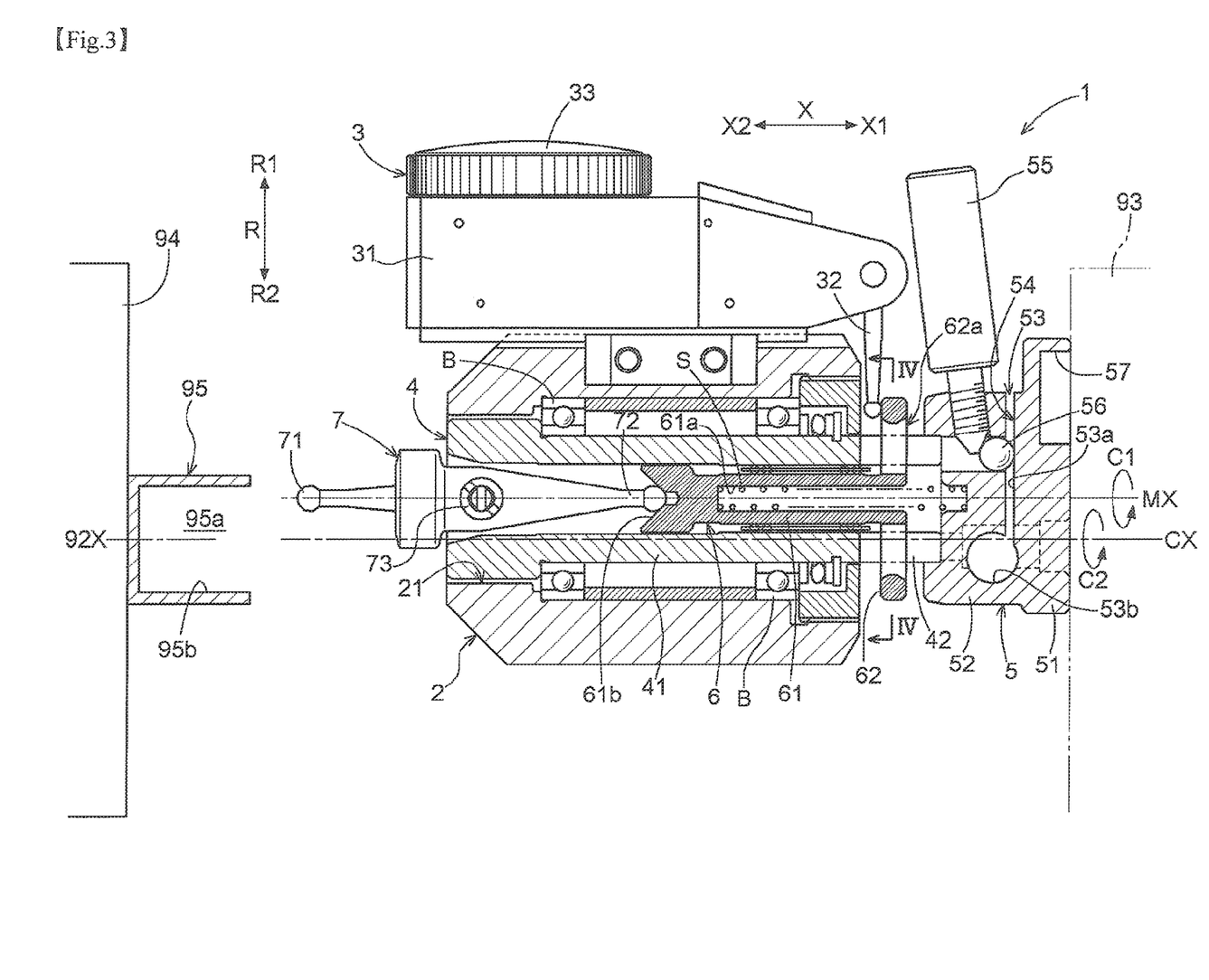
FIG. 3 is a section view showing principal portions of the misalignment determining device.

As shown in FIG. 2 and FIG. 3, the misalignment determining device 1 includes a tubular case 2 having a through hole 21 formed and extending therethrough along the axial direction X, a test indicator 3 attached to the outer face of the case 2 and capable of determining a minute amount of change in distance by a stylus 32, a tubular holder body 4 rotatably attached to the case 2 coaxially with the movement axis MX and extending through the through hole 21, a supporting body 5 attached to a base end side of the holder body 4 for supporting the holder body 4, a slidable body 6 provided on an inner side in a radial direction R of the holder body 4 and movable relative to the holder body 4 along the axial direction X, and a pivotal body 7 attached to a leading end side of the slidable body 6 and having a pivotable leading end portion whose pivotal amount is transmitted to the slidable body 6. Incidentally, the movement axis MX corresponds to what is referred to herein as the "axis of the case". Further, the radial direction R represents the direction perpendicular to the axial direction X. In the instant embodiment, as viewed from a certain member, the direction away from the movement axis MX along the radial direction R will be defined as a radial outer direction R1 and the direction approaching the movement axis MX will be defined as a radial inner direction R2, respectively.

As shown in FIGS. 5 through 8, the case 2 is provided with an approximately cylindrical shape having the through hole 21. This through hole 21 extends through the case 2 along the movement axis MX. To the outer face of the case 2, i.e. the face oriented to the radial outer direction R1, the test indicator 3 is attached and fixed thereto by means of bolts or the like. In the instant embodiment, as such test indicator, a lever-type test indicator 3 is employed. The test indicator 3 has a well-known configuration and is configured such that a minor pivotal (swing) movement of the stylus 32 is amplified via a gear mechanism (not shown) to be displayed by an indicator 33 provided in a main body 31.

As shown in FIG. 3, the holder body 4 is attached to the case 2 via a bearing B in the radial inner direction R2 of the case 2. Thus, this holder body 4 is movable relative to the case 2 about the movement axis MX. In the instant embodiment, the case 2 is arranged to be fixed to the rotatable holder body 4. For fixing the case 2, to this case 2, there is attached a fixing weight 8 to protrude in the radial outer direction R1 (see FIG. 8 for instance). The fixing weight 8 can be attached to either one of attaching holes 8a formed at two positions in the lateral face of the case 2. In the inner circumference of each attaching hole 8a, a female thread is formed, whereas a male thread is formed at an attaching portion of the fixing weight 8 to be attached to the attaching hole 8a. With meshing between the fixing weight 8 and the attaching hole 8a, the fixing weight 8 can be attached to the case 2. The fixing weight 8 is formed heavy. Accordingly, when the misalignment determining device 1 is operated with the fixing weight 8 being attached thereto, due to the weight of this fixing weight 8, the holder body 4 is rotated about the movement axis MX and the case 2 will become stationary, with the fixing weight 8 being located perpendicularly downwards. With this fixation of the case 2, the test indicator 3 attached to the outer face of this case 2 is fixed also. In the instant embodiment, as shown in FIGS. 5 through 8, an arrangement is made such that the attaching position of the fixing weight 8 in the outer circumferential face of the case 2 and the attaching position of the test indicator 3 form there between an angle which is slightly smaller than 180 degrees on an arc centered about the movement axis MX. With this arrangement, when the fixing weight 8 is located perpendicularly downwards, the indicator 33 will be oriented slightly tilted toward the fixing weight 8 side than the upward orientation, thus facilitating a user's checking of the indicator 33 form the lateral side of the misalignment determining device 1. Incidentally, the attaching holes 8a to one of which the fixing weight 8 is to be attached are provided one pair at positions in line symmetry relative to a normal line extending through the movement axis MX as seen along the axial direction X (see FIG. 8). Therefore, when a user selects either one attaching hole 8a depending on his/her standing position and attaches the fixing weight 8 thereto, the indicator 33 of the test indicator 3 can be brought to face this user, whether this user is standing on either side of the opposed sides of the misalignment determining device 1.

As shown in FIG. 3, the holder body 4 has an approximately cylindrical shape extending along the axial direction X and its inner circumferential face constitutes a holding portion 41 for holding the slidable body 6 and the pivotal body 7 in the radial inner direction R2. Further, the holder body 4 has an insertion portion 42 to be inserted into a through hole 62a formed in a radial extension portion 62 of the slider body 6 as will be described later (see FIG. 4 also). The insertion portion 42 is exposed to the outside of the case 2.

The slidable body 6 is held by the holding portion 41 of the holder 4. The slidable body 6 includes an axial extension portion 61 formed along the axial direction X and the radial extension portion 62 formed along the radial direction R. In the instant embodiment, an arrangement is provided such that the stylus 32 of the test indicator 3 and the radial extension portion 62 of the slidable body 6 may come into contact with each other. More particularly, in the instant embodiment, an arrangement is made such that a leading end portion of the stylus 32 and the radial extension portion 62 are overlapped with each other, as seen along the axial direction X (see FIG. 4) and also that the stylus 32 and the radial extension portion 62 come into contact with each other. Further, the stylus 32 is configured to follow the radial extension portion 62. And, the stylus 32 and the radial extension portion 62 are arranged not to depart from each other even when the radial extension portion 62 is moved in the axial direction X.

Figure 4:
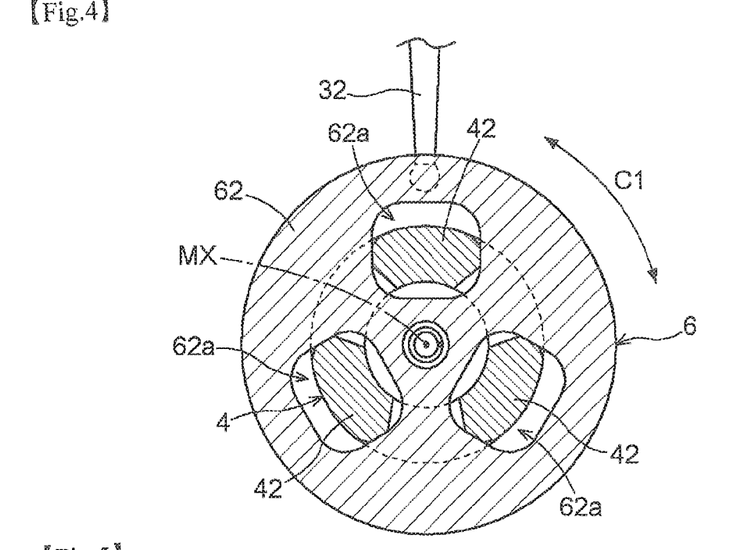
FIG. 4 is a section taken along IV-IV in FIG. 3.
Figure 5:
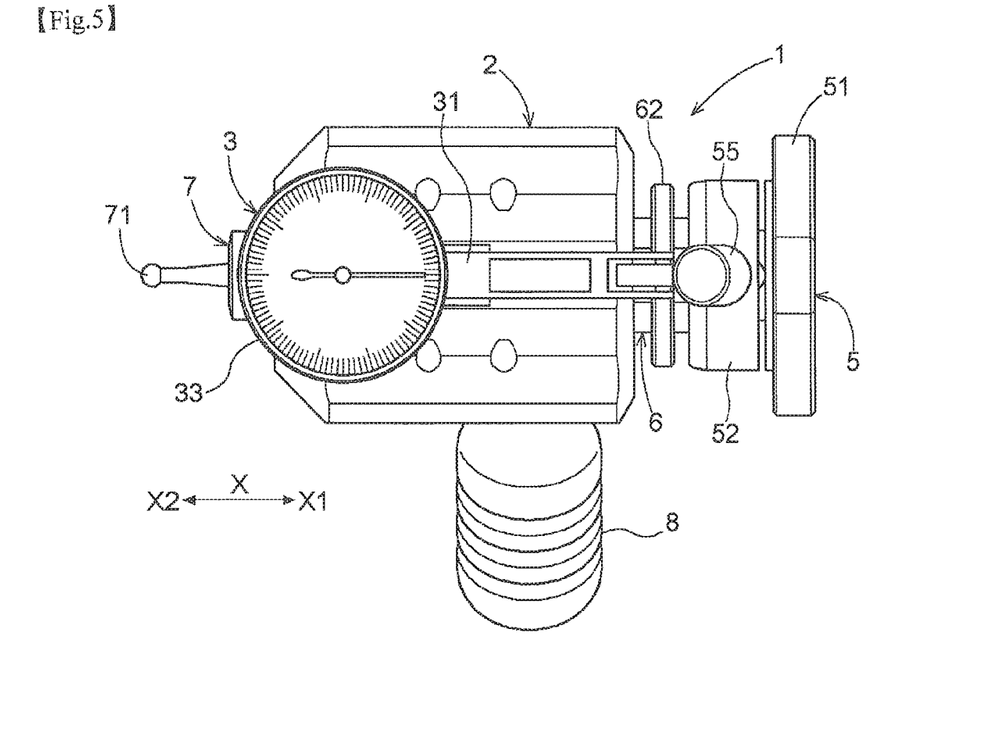
FIG. 5 is a plan view showing the misalignment determining device.
Figure 6:
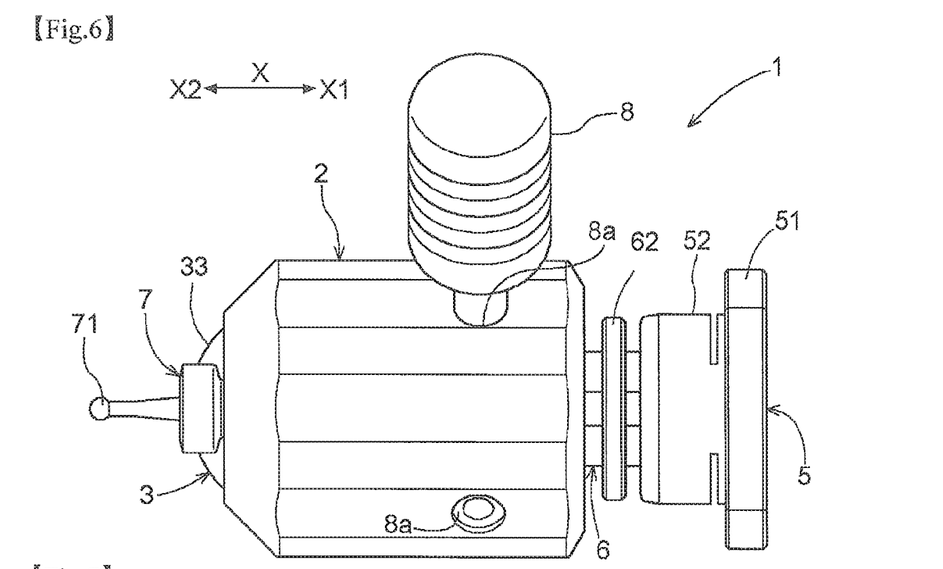
FIG. 6 is a bottom view showing the misalignment determining device.

The slidable body 6 has the through hole 62a which extends through the radial extension portion 62 in the axial direction X. As shown in FIG. 4, in the instant embodiment, three of such through holes 62a are formed in the radial extension portion 62. These three though holes 62a are disposed with an equal spacing therebetween along the first circumferential direction C1. As described hereinbefore, in the instant embodiment, into these through holes 62a, the insertion portions 42 of the holder body 4 are to be inserted. Namely, in this embodiment, in correspondence with the three through holes 62a, three insertion portions 42 are formed in the holder body 4. In this embodiment, under the state of the insertion portions 42 being inserted in the through holes 62a, when the inner circumferential faces of the through holes 62a come into contact at least partially with the outer circumferential faces of the insertion portions 42, the holder body 4 becomes non-rotatable relative to the radial extension portion 62 in the first circumferential direction C1. More particularly, of the inner circumferential faces of the insertion holes 62a and the outer circumferential faces of the insertion portions 42, faces extending from the side near the movement axis MX of the slidable body 6 and the side far therefrom will come into contact with each other. Therefore, the holder body 4 having the insertion portions 42 and the slidable body 6 having the through holes 62a will be rotated together about the movement axis MX. In other words, the holder body 4 and the slidable body 6 have their relative rotation therebetween restricted. On the other hand, the other portions than the contacting faces of the outer circumferential faces of the insertion portions 42 and the inner circumferential faces of the through holes 62a are configured not to come into contact with each other. Namely, the insertion portions 42 and the through holes 62a are not in gapless engagement with each other. And, the holder body 4 having the insertion portions 42 and the slidable body 6 having the through holes 62a are movable relative to each other in the axial direction X. In the instant embodiment, the holder body 4 is fixed to the case 2 in the axial direction X and to this fixed holder body 4, the slidable body 6 is movable in the axial direction X.

As shown in FIG. 3, in the radial inner direction R2 of the axial extension portion 61, there is formed a hollow portion 61a which is a bottomed hole extending along the movement axis MX. In this hollow portion 61a, there is mounted a coil spring S which is a compression spring configured to generate a force in the axial first direction X1 which is one direction of the axial direction X and in the axial second direction X2 which is the other direction of the same. An end portion of the coil spring S in the axial second direction X2 is arranged to come into contact with the slidable body 6 and the other end portion of the coil spring S in the axial first direction X1 is arranged be placed in contact with the supporting body 5. Thus, the coil spring S urges the slidable body 6 in the axial second direction X2.

Further, at the end portion of the axial extension portion 61 in the axial second direction X2, there is formed a tapered inner circumferential face 61b whose diameter progressively decreases toward the axial first direction X1. This tapered inner circumferential face 61b is arranged to come into contact with the pivotal body 7.

Figure 10:
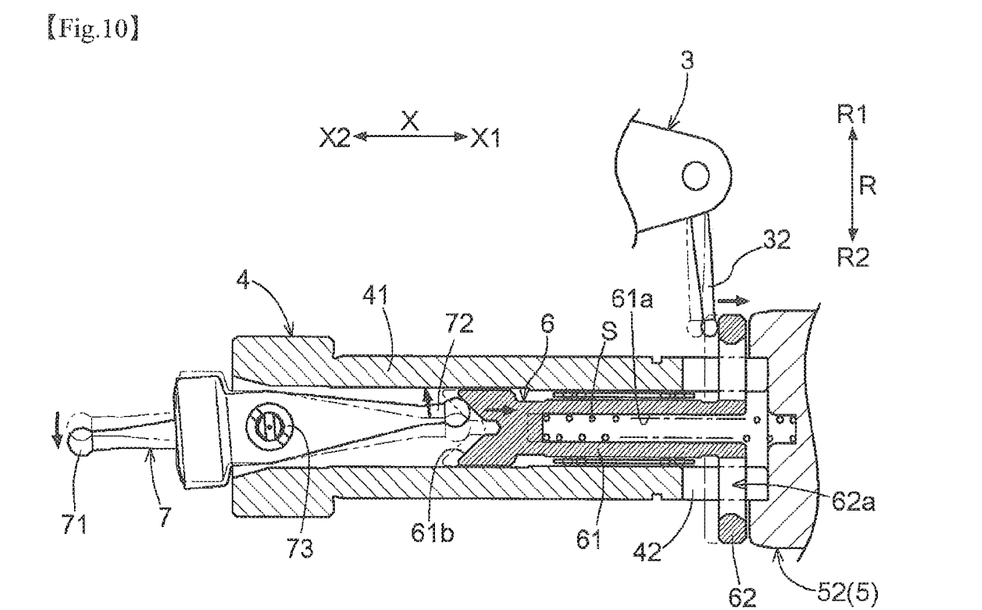
FIG. 10 is a view for explaining movements of the misalignment determining device when a misalignment is to be determined.

The pivotal body 7 is disposed along the axial direction X and is attached, as being held to the holder body 4, to the end of the slidable body 6 in the axial second direction X2. The pivotal body 7 includes a transmission portion 72 to come into contact with the tapered inner circumferential face 61b of the slidable body 6 and a determination portion 71 to come into contact with a determination target article. And, this pivotal body 7 is pivotally supported to a pivotal supporting shaft 73 disposed between the transmission portion 72 and the determination portion 71. The pivotal supporting shaft 73 extends through the holder body 4 from the radial outer direction R1 to the radial inner direction R2 and is inserted in the pivotal body 7. Further, between the pivotal supporting shaft 73 and the pivotal body 7, a bearing (not shown) is provided. Thus, the pivotal body 7 is pivotable about the pivotal supporting shaft 73. In the instant embodiment, a pivotal amount of the pivotal body 7 is transmitted via the axial extension portion 61 of the slidable body 6 to its radial extension portion 62, so that this amount can be determined by the stylus 32 of the test indicator 3 placed in contact with this radial extension portion 62. Specifically, as shown in FIG. 10, when the determination portion 71 is pivoted, the transmission portion 72 is pivoted via the pivotal supporting shaft 73. As this transmission portion 72 is pivotable along the tapered inner circumferential face 61b of the slidable body 6, it provides a force to the slidable body 6 in the axial first direction X1. This force moves the slidable body 6 in the axial first direction X1 against the force of the coil spring S which presses the slidable body 6 in the axial second direction X2. With this, the radial extension portion 62 which is a part of the slidable body 6 is also moved in the axial first direction X1, whereby the stylus 32 of the test indicator 3 placed contact with the radial extension portion 62 will be pivoted. In this way, the misalignment determining device 1 can determine a pivotal amount of the pivotal body 7 by the test indicator 3.

Figure 7:
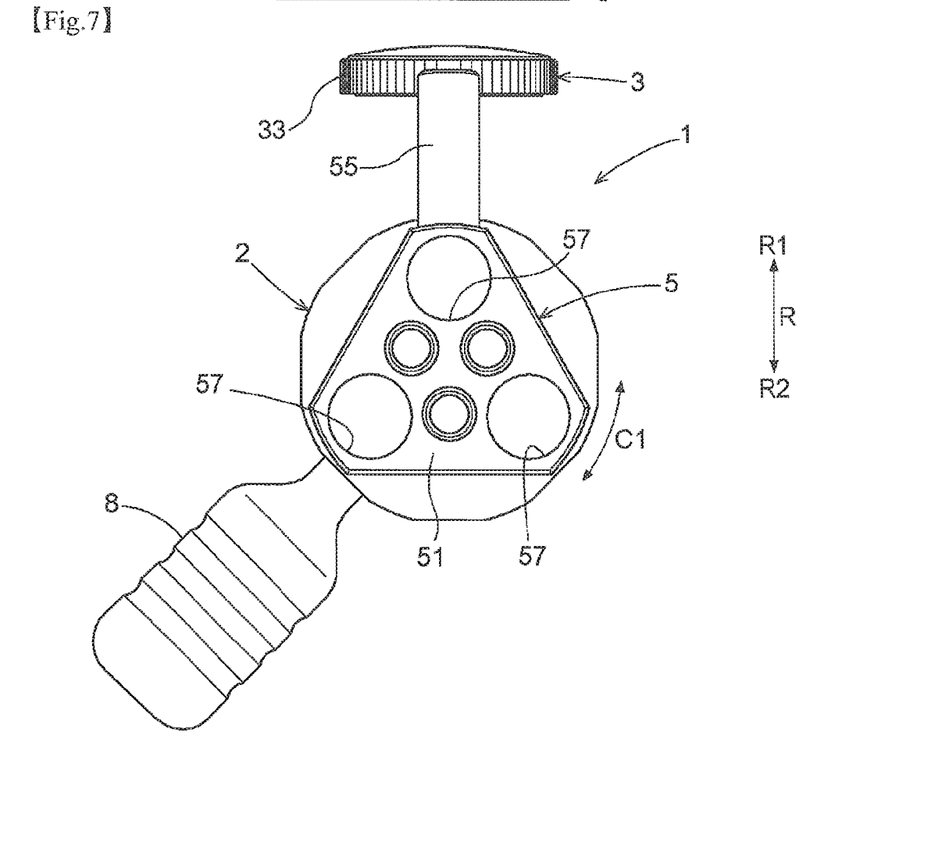
FIG. 7 is a right side view showing the misalignment determining device.

As shown in FIG. 2 and FIG. 3, etc., the supporting body 5 has an attaching portion 51 to be attached to the rotary table 93 and an adjustment portion 52 for adjusting a tilt of the misalignment determining device 1 relative to the axial direction X. As shown in FIG. 7, in the attaching portion 51 of the supporting body 5, there are formed three magnet holes 57. Via magnets (not shown) pressed in or magnetically held in these magnetic holes 57, the supporting body 5 is attached to the rotary table 93.

As shown in FIG. 3, the supporting body 5 has an adjustment slit 53 which is formed as a portion cut out along a direction perpendicular to the axial direction X and an adjustment pressing portion 54 configured to press one of opposed faces of the adjustment slit 53 farther from the holder body 4 for applying a force to the adjustment slit 53 in a direction of opening it. The adjustment slit 53 has an extended portion 53b with an increased width in the axial direction X at a position away from the movement axis MX in the radial direction R. The extended portion 53b is formed at one end portion of the adjustment slit 53 in the radial direction R. The other end portion of the adjustment slit 53 in the radial direction R is in communication with the outside of the supporting body 5 in the radial outer direction R1.

The adjustment pressing portion 54 is disposed at a position away from the movement axis MX in the radial outer direction R1. In the instant embodiment, the adjustment pressing portion 54 is disposed at a position opposite the extended portion 53b of the adjustment slit 53 across the movement axis MX. At the adjustment pressing portion 54, there are provided a ball 56 for pressing a pressing face 53a of the adjustment slit 53 and an adjustment handle 55 that extends through the supporting body 5 in the radial outer direction R1 and that comes into contact with the ball 56 in the axial second direction X2. The adjustment handle 55 has, at the leading end thereof, a male thread that can mesh with a female thread formed in the supporting body 5. Further, the leading end portion of the male thread of the adjustment handle 55 is provided as a tapered shape whose diameter progressively decreases toward the leading end side. The ball 56 is placed in contact with the tapered leading end portion of the male thread of the adjustment handle 55 in the axial second direction X2 and placed in contact also with the pressing face 53a of the adjustment slit 53 in the axial first direction X1. In operation, as the adjustment handle 55 is screwed in toward the radial inner direction R2, the tapered leading end portion of the male thread of the adjustment handle 55 will push the ball 56 toward the axial first direction X1. And, the ball 56 pressed in by the male thread of the adjustment handle 55 will press the pressing face 53a to the axial first direction X1. In the course of this, the ball 56 pressing the pressing face 53a, will be pressed, by the reaction force, from the pressing face 53a to the axial second direction X2. As a result, the adjustment slit 53 will be progressively opened in the axial direction X and the portion of the supporting body 5 toward the axial second direction X2 from the adjustment slit 53 will become tilted relative to the axial direction X about the extended portion 53b of the adjustment slit 53 as the fulcrum point. With this, the tilt of the misalignment determining device 1 as a whole can be adjusted. And, the tilt of the misalignment determining device 1 as a whole can be finely adjusted by a screwing-in amount of the adjustment handle 55.

Next, determination of misalignment of the center 92 using the misalignment determining device 1 will be explained. As shown in FIG. 3, firstly, the center 92 is removed from the tailstock platform 94 and a cup-shaped guiding body 95 is attached to the tailstock platform 94. In this, the guiding body 95 will be attached to the tailstock platform 94 in such a manner that its opening portion 95a is oriented toward the axial first direction X1 and also the axis of the guiding body 95 is brought into agreement with a center axis 92X of the center 92. In the inner circumference of the guiding body 95, there is formed a guiding face 95b for guiding the determination portion 71 of the pivotal body 7. Here, the misalignment determining device 1 is mounted to the rotary table 93 with an offset from the main axis CX such that the outer face of the determination portion 71 may be placed in contact with the guiding face 95b. And, as the rotary drive device 90 is operated with placing the determination portion 71 of the pivotal body 7 along the guiding face 95b, misalignment of the center 92 is determined. In this, the contact of the determination portion 71 relative to the guiding face 95b can be adjusted by tilting the misalignment determining device 1 as a whole through adjustment of the screwing-in amount of the adjustment handle 55. Namely, for placing the determination section 71 into contact with the guiding face 95b, the attaching position of the misalignment determining device 1 relative to the rotary table 93 will be adjusted roughly and finally, the screwing-in amount of the adjustment handle 55 will be finely adjusted.

Figure 8:
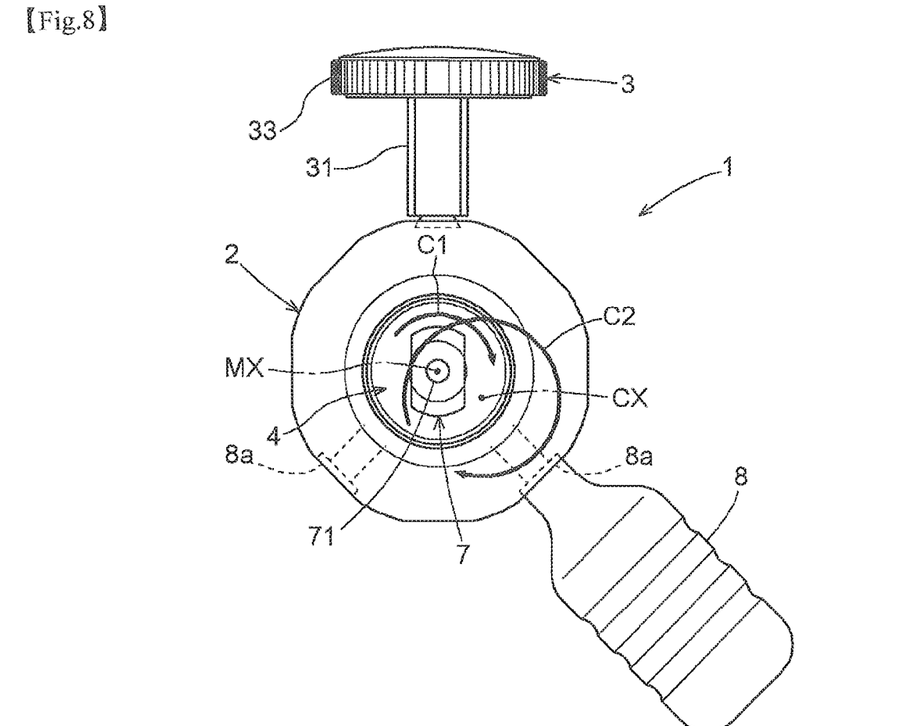
FIG. 8 is a left side view illustrating movements of the misalignment determining device.

When the rotary drive device 90 is operated, as shown in FIG. 8, the misalignment determining device 1 will revolve about the main axis CX along the second circumferential direction C2 and will also spin about the movement axis MX along the first circumferential direction C1. In the course of this, due to the weight of the fixing weight 8, the case 2 and the test indicator 3 will be fixed, and the components disposed on the inner side of the case 2 will spin about the movement axis MX.

Figure 9:
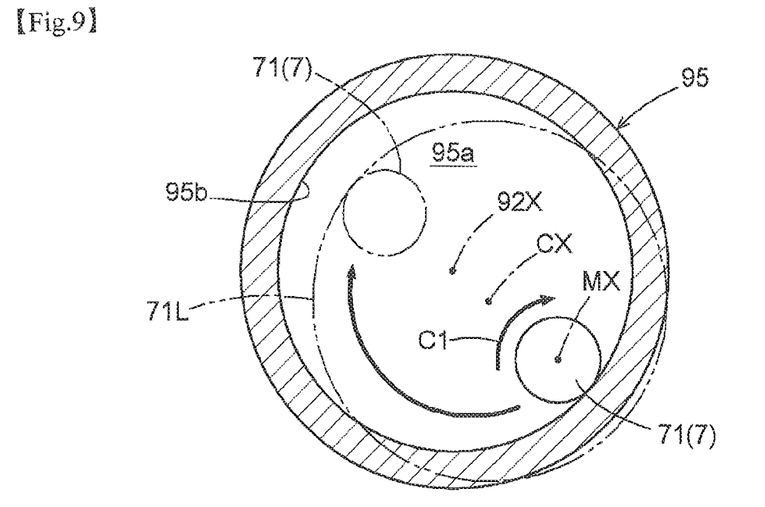
FIG. 9 is a schematic showing movements of the misalignment determining device.

If the center axis 92X and the main axis CX are not in agreement, there will occur e.g. a situation shown in FIG. 9. The circle shown by the virtual line (two-dot chain line) in FIG. 9 represents a revolution locus 71L along which the determination portion 71 revolves about the main axis CX. As shown in FIG. 9, since the center axis 92X and the main axis CX are not in agreement, revolving of the determination portion 71 along the revolution locus 71L will be interfered by the guiding face 95b of the guiding body 95. That is, in this case, the determination portion 71 will revolve along the guiding face 95b for a predetermined range and will revolve along the revolution locus 71L for the range other than the predetermined range, without contacting the guiding face 95b. As shown in FIG. 9, of the period of revolving of the determination portion 71 along the guiding face 95b, except for the period immediately after contacting of the determination portion 71 to the guiding face 95b and the period immediately before detaching of the determination portion 71 from the guiding face 95b, this determination portion 71 is being pushed by the guiding face 95b to the direction of the center axis 92X. Therefore, as shown in FIG. 10, the pivotal body 7 will be pivoted in association with the revolving of the determination portion 71 and the amount of this pivotal movement will be transmitted via the pivotal body 6 to the stylus 32 of the test indicator 3. Namely, in association with pivoting of the determination portion 71, the transmission portion 72 too will be pivoted via the pivotal supporting shaft 73. Since the transmission portion 72 is pivoted along the tapered inner circumferential face 61b of the slidable body 6, the slidable body 6 is pushed in in the axial first direction X1 against the force of the coil spring S and also this slidable body 6 is moved in the axial first direction X1. As a result, the radial extension portion 62 which forms a part of the slidable body 6 will also be moved in the axial first direction X1, so that the stylus 32 placed in contact therewith will be pivoted. And, as shown in FIG. 9, in the period of revolving of the determination portion 71 without contacting the guiding face 95b and the period immediately after contacting of the determination portion 71 to the guiding face 95b and the period immediately before detaching of the determination portion 71 from the guiding face 95b, the determination portion 71 is not being pushed by the guiding face 95b. Therefore, as indicated by virtual lines in FIG. 10, the pivotal body 7 will return to its original state from the pivoted state and the slidable body 6 will be urged by the spring S in the axial second direction X2 to be moved in the axial second direction X2 and returned to its original state. And, in association with the movement of the slidable body 6, the stylus 32 of the test indicator 3 placed in contact with the radial extension portion 62 will also return to its original state. In this way, with alternation of the stylus 32 between the pivoted state and the original state, it is possible to confirm that the center axis 92X is not in agreement with the main axis CX.

Here, in case the center axis 92X and the main axis CX are in agreement with each other, although the determination portion 71 is in contact with the guiding face 95b, this determination portion 71 is not pivoted, so the stylus 32 is not pivoted. Therefore, the pointer of the indicator 33 will not be pivoted, either. Notwithstanding, even when the center axis 92X and the main axis CX are in agreement, if e.g. the size of the opening portion 95a of the guiding body 95 is smaller than the revolution locus 71L of the determination portion 71, the determination portion 71 will revolve with constantly contacting the guiding face 95b. In such case too, since the center axis 92X and the man axis CX are in agreement, the pivotal amount of the determination portion 71 will always remain constant, so the determination portion 71 will not be pivoted and the stylus 32 of the test indicator 3 will not be pivoted, either. Thus, it is possible to confirm that the center axis 92X and the main axis CX are in agreement.

In the foregoing, there has been explained determination of misalignment of the center 92. However, in order to effect a so-called "centering" for aligning the center axis 92X with the main axis CX, an arrangement will be provided such that the indicator 33 of the test indicator 3 will not be pivoted or pivoted only for a certain amount and coordinates position of the tailstock platform 94 may be adjusted during the misalignment determination described above.

Figure 11:
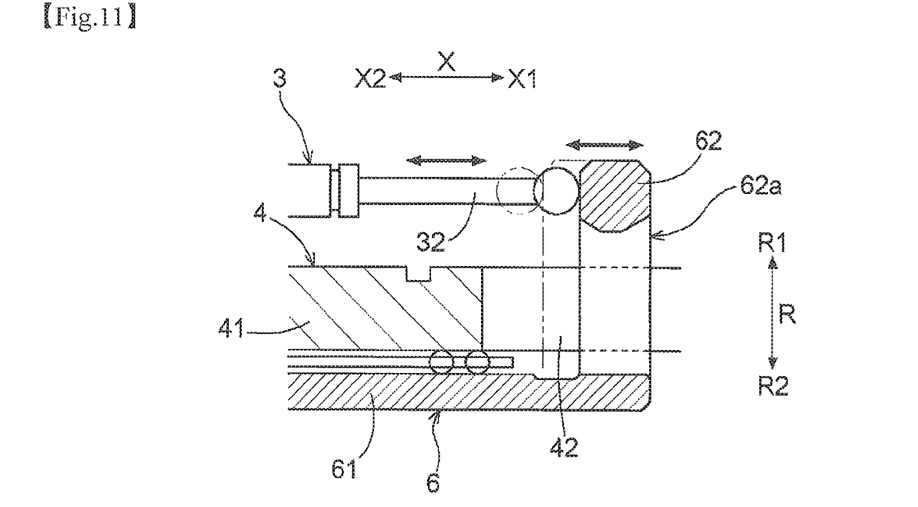
FIG. 11 is an enlarged view showing principal portions of a misalignment determining device relating to a further embodiment.

Other Embodiments (1) In the foregoing embodiment, there was explained an example in which the misalignment determining device 1 is constituted of a lever type test indicator 3. However, the present invention is not limited thereto. Namely, the inventive misalignment determining device may be constituted of a spindle type dial gauge, instead. As shown in FIG. 11, a spindle type dial gauge 3 is configured to determine a minute amount of change in distance based on a protrusion/retraction amount of its stylus 32. In this case, the protrusion and retraction directions of the stylus 32 will be aligned with the axial direction X and this stylus 32 will be brought into contact with the radial extension portion 62 of the slidable body 6 from the axial second direction X2, whereby misalignment of a determination target article can be determined. In this, the length of the radial extension portion 62 in the radial direction R should be adjusted appropriately to such a length that allows the stylus 32 to come into contact therewith.

(2) In the foregoing embodiment, there was explained an example in which the stylus 32 of the test indicator 3 comes into contact with the radial extension portion 62 of the slidable body 6 from the axial second direction X2. However, the present invention is not limited thereto. Namely, it is also possible to arrange such that the stylus 32 comes into contact with the radial extension portion 62 from the axial first direction X1. In this case too, the test indicator 3 can determine a pivotal amount of the pivotal body 7 converted into a movement amount in the axial direction X.

(3) In the foregoing embodiment, there was explained an example in which the pressing face 53*a* to be pressed by the ball 56 is the one of the opposed faces of the adjustment slit 53 farther from the holder body 4. However, the present invention is not limited thereto. Namely, the pressing face 53*a* to be pressed by the ball 56 may be the other one of the opposed faces of the adjustment slit 53 which is closer to the holder body 4. In this case, the adjustment handle 55 and the ball 56 will be provided at positions in the axial first direction X1 relative to the adjustment slit 53. Further, the adjustment handle 55 will be arranged to come into contact with the ball 56 from the axial first direction X1. With this configuration too, the adjustment slit 53 can be opened by pressing of the pressing face 53*a* in the axial second direction X2 by the ball 56 pushed in by the adjustment handle 55. Therefore, tilt of the misalignment determining device 1 relative to the axial direction X can be adjusted.

(4) The present invention is not limited to the respective embodiments described above, but may be modified in any way within a range not depart from its essence. And, the respective embodiments described above can be combined in any manner within a range resulting in contradiction.

REFERENCE SIGNS LIST

1: misalignment determining device
2: case
3: test indicator
4: holder body
5: supporting body
6: slidable body
7: pivotal body
21: through hole
32: stylus
42: insertion portion
53: adjustment slit
53*a*: pressing face
54: adjustment pressing portion
61: axial extension portion
62: radial extension portion
62*a*: insertion hole
92X: center axis
C1: first circumferential direction
C2: second circumferential direction
CX: main axis
MX: movement axis
R: radial direction
R1: radial outer direction
R2: radial inner direction
X: axial direction
X1: axial first direction
X2: axial second direction

The invention claimed is:
1. A misalignment determining device comprising:
   a tubular case having a through hole that extends therethrough in an axial direction;
   a test indicator attached to an outer face of the case and capable of determining a minute amount of change of distance by a stylus;
   a tubular holder body rotatably attached to the case coaxially with the axis of the case and through the through hole;
   a supporting body attached to a base end side of the holder body for supporting the holder body;
   a slidable body provided on an inner side of the holder body in a radial direction and movable relative to the holder body along the axial direction;
   a pivotal body attached to a leading end side of the slidable body and having a pivotable leading end portion whose pivotal amount is transmitted to the slidable body;
   the slidable body including an axial extension portion formed along the axial direction and a radial extension portion formed along the radial direction; and
   the stylus of the test indicator and the radial extension portion of the slidable body coming into contact with each other, so that a pivotal amount of the pivotable body is transmitted via the axial extension portion to the radial extension portion of the slidable body to be determinable by the stylus of the test indicator in contact with the radial extension portion.

2. The misalignment determining device of claim 1, wherein:
   the slidable body has a through hole that extends through the radial extension portion in the axial direction;
   the holder body has an insertion portion to be inserted into the through hole; and
   when an inner circumferential face of the through hole comes into contact at least partially with an outer circumferential face of the insertion portion as the insertion portion is inserted in the through hole, the holder body becomes non-rotatable in a circumferential direction relative to the radial extension portion.

3. The misalignment determining device of claim 1, wherein:
   the supporting body has an adjustment slit which is formed as a portion cut out along a direction perpendicular to the axial direction and an adjustment pressing portion configured to press one of opposed faces of the adjustment slit farther from the holder body for applying a force to the adjustment slit in a direction of opening it; and
   the adjustment pressing portion is disposed at a position away from the axis in the radial direction.

4. The misalignment determining device of claim 2, wherein:
   the supporting body has an adjustment slit which is formed as a portion cut out along a direction perpendicular to the axial direction and an adjustment pressing portion configured to press one of opposed faces of the adjustment slit farther from the holder body for applying a force to the adjustment slit in a direction of opening it; and
   the adjustment pressing portion is disposed at a position away from the axis in the radial direction.

* * * * *